US011807657B2

(12) United States Patent
Kienberger et al.

(10) Patent No.: US 11,807,657 B2
(45) Date of Patent: Nov. 7, 2023

(54) PROCESS FOR ISOLATING LIGNIN FROM AN ALKALINE PROCESS STREAM

(71) Applicant: PAPIERHOLZ AUSTRIA GMBH, St. Gertraud (AT)

(72) Inventors: Marlene Kienberger, Graz (AT); Matthaeus Siebenhofer, Graz (AT); Thomas Michael Pichler, Gabersdorf (AT)

(73) Assignee: PAPIERHOLZ AUSTRIA GMBH, St. Gertraud (AT)

( * ) Notice: Subject to any disclaimer, the term of this patent is extended or adjusted under 35 U.S.C. 154(b) by 330 days.

(21) Appl. No.: 17/251,232

(22) PCT Filed: Jun. 12, 2019

(86) PCT No.: PCT/EP2019/065396
§ 371 (c)(1),
(2) Date: Dec. 11, 2020

(87) PCT Pub. No.: WO2019/238783
PCT Pub. Date: Dec. 19, 2019

(65) Prior Publication Data
US 2021/0261590 A1 Aug. 26, 2021

(30) Foreign Application Priority Data
Jun. 15, 2018 (AT) .................................. A 175/2018

(51) Int. Cl.
*C07G 1/00* (2011.01)
*B01J 19/24* (2006.01)
*D21C 11/00* (2006.01)

(52) U.S. Cl.
CPC .............. *C07G 1/00* (2013.01); *B01J 19/244* (2013.01); *D21C 11/0007* (2013.01)

(58) Field of Classification Search
CPC .......................... B01J 19/244; D21C 11/0007
See application file for complete search history.

(56) References Cited

U.S. PATENT DOCUMENTS 9,139,606 B2   9/2015  Miettinen
2011/0297340 A1  12/2011  Kouisni et al.
(Continued)

FOREIGN PATENT DOCUMENTS

ES            2663027 T3 *  4/2018  ............. C01B 32/00
WO       2006/031175        3/2006
(Continued)

OTHER PUBLICATIONS

Konopacka-Lyskawa et al. (Powder Technology 190, 2009, 319-323) (Year: 2009).*
(Continued)

*Primary Examiner* — Liam J Heincer
(74) *Attorney, Agent, or Firm* — Jacobson Holman PLLC

(57) ABSTRACT

A process for isolating lignin from an alkaline process stream of thickened black liquor which is introduced continuously into a lower region of at least one circulation reactor having two reactor zones in concentric arrangement, liquid level of the alkaline process stream in the interior of the reactor is at a level with an upper end of an inner tubular reactor zone, a $CO_2$-containing gas is blown continuously from the bottom into the inner tubular reactor zone of the reactor, wherein the $CO_2$-containing gas is absorbed by the alkaline process stream in the inner circulation reactor zone and offgas is drawn off with residual amounts of the $CO_2$ at the top of the reactor, the process is run at 1 atm, and thickened black liquor with a reduced lignin content together with precipitated lignin present are drawn off optionally after settling at the base of the reactor.

9 Claims, 1 Drawing Sheet

(56) References Cited

U.S. PATENT DOCUMENTS

2015/0119559 A1* 4/2015 Ohman .................. C08H 8/00
530/500
2016/0115281 A1 4/2016 Lake et al.

FOREIGN PATENT DOCUMENTS

| WO | 2008/079072 | 7/2008 |
| WO | 2009/104995 | 8/2009 |
| WO | 2012/049375 | 4/2012 |
| WO | 2014/116150 | 7/2014 |
| WO | 2016/165023 | 10/2016 |

OTHER PUBLICATIONS

Deen et al. (Bubble Columns, Ullmann's Encyclopedia of Industrial Chemistry, vol. 6, 359-380, 2012) (Year: 2012).*
International Search Report.

* cited by examiner

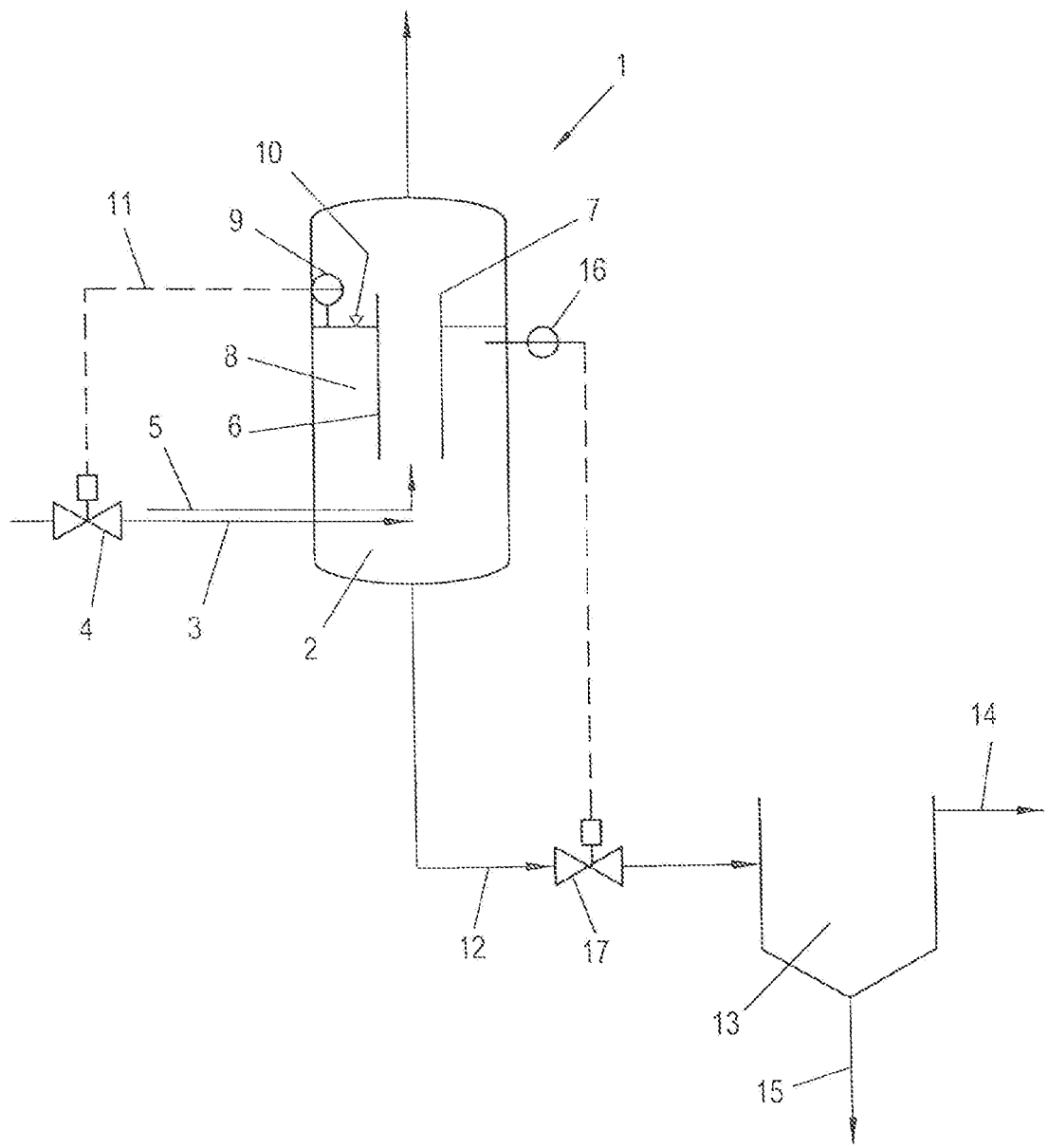

PROCESS FOR ISOLATING LIGNIN FROM AN ALKALINE PROCESS STREAM

BACKGROUND ON THE INVENTION

The present invention relates to a process for isolating lignin from an alkaline process stream.

Next to cellulose, lignin is the major product of wood pulp production and furthermore, lignin is the second most common biopolymer which occurs worldwide. There are a large number of possible applications for lignin, such as the production of vanilla or carbon fibres, for example, or even applications such as being used as starch replacement materials in the production of paper on the papermaking machine. The sustainable implementation of lignin in the production of the most diverse substances or in the most diverse processes is currently the subject of highly intensive research activities worldwide, but to date, no commercially available lignin products as well as economically implementable processes have been discovered for lignin originating from the Kraft process. This is because when lignin which originates from the Kraft process is used, a wide variety of difficulties arise, such as the characteristic odour and colour of the product, as well as the variable quality of the lignin which is obtained, which can be ascribed to the different raw or starting materials used for the digestion process as well as differences in processing. Currently, lignin is used exclusively for fueling the chemical recycling digester, and when it has been precipitated and purified, such as when the Lignoforce process from the NORAM Group is applied, for example, it can be used as a fuel in the lime kiln, because here, $CO_2$ savings and a higher plant productivity are expected.

Prior art processes for isolating lignin from alkaline process streams such as, for example, from the black liquor originating from the wood pulping process, have been described many times in the literature. The best known of these processes are what are known as the LignoBoost process (trade mark of Valmet Aktiebolag) and the Lignoforce process from the NORAM Group which, in order to be able to be operated economically, use pressurized synthesized carbon dioxide to precipitate lignin from the alkaline process stream. However, both the LignoBoost process and also the Lignoforce process, which are both widely used, can only be used discontinuously in order to produce lignin with reasonably reproducible qualities, which can compromise both the equipment costs as well as the lignin productivity. Thus, other processes were sought out which on the one hand can produce or recover lignin with a consistent quality from an alkaline process stream, and on the other hand can keep the equipment costs as well as the energy costs as low as possible.

A further disadvantage of known processes of the prior art is not only their discontinuous mode of operation, but above all the problem of foaming in the reactor which occurs when blowing in, which foaming can only be kept in check by operating the reactor at an increased pressure, so as not to compromise the process.

U.S. Pat. No. 9,139,606 B2 already discloses a continuous process for the precipitation of lignin from black liquor, in which black liquor is supplemented with an acidifying agent in a pressurized continuous flow reactor, with a dwell time of less than 300 s. After abrupt release of the pressure, lignin precipitates out of the black liquor which has been supplemented with acid. The disadvantage with that process is the use of a pressurized reactor which is not advantageous, both from an energetic viewpoint as well as from the viewpoint of handling in industrial use.

In summary, therefore, among the many already known processes, every process which operates at ambient pressure suffers from a major problem with dealing with the foam which is formed in the reactor during the conversion, and every process which enables continuous lignin precipitation from alkaline process fluids has to be operated under raised pressures or with pressure swings. It hardly needs to be mentioned that clearly, other processes for precipitating lignin, for example using ion exchangers, have been described in the literature, but none of them can be described as being particularly economical.

SUMMARY OF THE INVENTION

Thus, there is a need for a further improvement to the known processes for the precipitation of lignin from an alkaline process stream to be provided with which it is possible on the one hand to provide a process protocol which is as simple as possible, both as regards the steps of the process and also as regards the equipment costs, which furthermore requires little energy, and which can be operated continuously at ambient pressure.

In order to overcome this problem, the process in accordance with the invention is essentially characterized in that the alkaline process stream is introduced continuously into a lower region of at least one circulation reactor having two reactor zones in a concentric arrangement, in that a liquid level of the alkaline process stream in the interior of the at least one circulation reactor is chosen essentially at a level with an upper end of at least one inner tubular reactor zone, in that a $CO_2$-containing gas is blown continuously from the bottom into the at least one inner tubular reactor zone of the at least one circulation reactor, in that the $CO_2$-containing gas is absorbed by the alkaline process stream in the at least one inner circulation reactor zone and offgas is drawn off together with residual amounts of the $CO_2$ at the top of the at least one circulation reactor, in that the process is run at ambient pressure, and in that thickened black liquor with a reduced lignin content together with precipitated lignin present therein are drawn off, optionally after settling at the base of the at least one circulation reactor. In addition to the selected manner of introducing the process streams, namely such that the alkaline process stream is introduced continuously into a lower region of a circulation reactor having at least two reactor zones in a concentric arrangement and at the same time, a $CO_2$-containing gas is continuously blown in from the bottom essentially exclusively into the at least one inner tubular reactor zone of the circulation reactor, this means that the process can be operated such that the $CO_2$-containing gas, in particular the $CO_2$ of the $CO_2$-containing gas, is successively absorbed in the alkaline process liquor and thus the pH thereof falls, whereupon, after dropping below a threshold pH for the precipitation of lignin, which is in the range from approximately 8 to 13, in particular a pH of approximately 9 to 11 at a room temperature of 25° C., lignin is precipitated from the alkaline process liquor. The $CO_2$ which is essentially exclusively blown into the at least one inner reactor zone rises upwards in this reactor zone in the direction of a gas outlet, thereby moving the thickened black liquor into which it is blown upwards, and therefore generates circulating flow of the black liquor which has been introduced without having to provide pumping equipment for this. Surprisingly with this process protocol, despite carrying out the process under normal pressure, the severe foam formation which usually occurs in processes of this type for isolating lignin from alkaline process streams can be almost completely suppressed. With the selected process protocol and by using the circulation reactor, the absorption of $CO_2$ occurs primarily in the inner tubular reactor zone and settling of lignin subsequently occurs in the outer annular reactor zone of the circulation reactor, in particular because of the slow circulation which is brought about by the normal pressure inside the reactor. This means that foaming can be suppressed in a particularly efficient manner, in that the reactor design is selected such that the upper end of the inner tubular reactor zone does not exceed the level of the liquid in the circulation reactor and the stream of liquid can simply flow into the outer reactor zone. In a process protocol of this type or with a reactor design of this type, foam which is formed during the absorption of the $CO_2$ is immediately destroyed again following its formation because of the separation between the liquid phase with solids and the liquid phase with $CO_2$ at the upper end of the inner tubular reactor zone, so that the foam formation during the precipitation of lignin in the outer annular region of the circulation reactor can no longer have a negative influence.

Management of the process in accordance with the invention is independent of the selected number of inner tubular reactor zones; only one inner tubular reactor zone or in fact a plurality thereof may be provided, depending on the size and the desired throughput of the circulation reactor.

Furthermore, because the lignin precipitated in the outer annular reactor zone of the circulation reactor either settles directly in the circulation reactor, in which case the base of the circulation reactor is in particular conical in configuration, or in fact lignin, together with the alkaline process stream with a reduced lignin content, is discharged from the reactor, it is possible to provide a lignin precipitation process which is carried out continuously in a device in which the equipment is simplified in which, furthermore, no moving parts such as stirrers or the like are required in order to carry out the process.

In the context of the present invention, the term "circulation reactor" should be understood to mean a reactor which has an essentially cylindrical shape in the interior of which a tubular reactor zone is arranged with the upper end thereof ending below the upper end of the cylinder and which leaves an annular gap to manage the circulation of material. In principle, a reactor of this type operates on the principle of an airlift pump and an airlift reactor or a combination of these two devices, wherein no moving parts are provided in the interior of the circulation reactor. Fittings such as sensors, management and control devices as well as the possibility of providing the reactor with a double shell or with only one shell are encompassed herein and do not influence the process protocol. Finally, the circulation reactor may be operated as a reactor with an inner circulation as well as with an outer circulation, in which the input sides of gas and alkaline process stream are simply reversed. A variation in equipment of this type will also not affect the continuous process protocol and the results that can be obtained therefrom.

Because the process is operated in a manner such that the alkaline process stream forms the circulating flow in the circulation reactor, and because the rate of circulation in the interior of the reactor is set by the incoming quantity of alkaline process stream used, the quantity of alkaline process stream available for the reaction per unit of time can also be set so that consistent process conditions can be maintained, and thus consistent product qualities can also be obtained. In this regard, in the inner tubular reactor zone, acidification of the alkaline process stream by absorption of the $CO_2$ introduced into the process stream and conversion of the basic components into acid-reacting components is obtained. Due to the upward rise of the $CO_2$-containing gas in the interior of the inner tubular reactor zone of the circulation reactor, the alkaline process stream is forced into motion and flows over the upper edge of the inner tubular reactor zone into the outer annular reactor zone of the circulation reactor. In this region, which is essentially free from rising $CO_2$, a smooth, preferably laminar flow of alkaline process liquor or of the process stream is formed which now, because of the reduced pH and consequent exceeding of the solubility product of lignin, contains precipitated lignin, is fed in the direction of an outlet provided on the base of at least one circulation reactor, or is allowed to sediment out. By means of this circulation of the alkaline process stream, which only comes into contact with $CO_2$ in the inner region of the circulator, then on the one hand, foam formation thereof is inhibited, the process stream is acidified and in particular, the dwell time of the process stream, which is only a function of the input flow, can be selected to be sufficiently slow to cause a precise precipitation of lignin, in particular with the desired lignin quality, from the alkaline process stream. Furthermore, with this process protocol and the special reactor design, both the process stream as well as the dwell time for $CO_2$ can be managed or controlled by adjusting the height of the inner tubular reactor zone.

Furthermore, because the process is managed in a manner such that it is carried out at ambient pressure, in particular at 1 atm, this further simplifies the equipment of the reactor system. Furthermore, by carrying out the process under normal pressure, i.e. one atmosphere, the energy balance of the process is significantly improved compared with conventional processes.

Because the process is managed in a manner such that a rate of $CO_2$ absorption in the thickened black liquor is managed or controlled by the $CO_2$ concentration in the $CO_2$-containing gas, the pH of the alkaline process stream or of the thickened black liquor can be dropped at any rate, depending on the quantity or concentration of the added $CO_2$. The rate at which the pH falls here is directly proportional to the quantity of the $CO_2$ which is added. With a process protocol of this type, it is possible to manage or control the rate of precipitation of lignin from the alkaline process stream, namely because the supersaturation of the solution in $CO_2$ is directly proportional to the growth of particles of precipitated lignin, whereupon the quality and the product properties of the precipitated lignin can also be influenced. Furthermore, because the circulation rate is increased by the larger quantity of gas which is present, settling of the lignin particles formed in the circulation reactor is made more difficult, so that this can, for example, be discharged from the reactor with the process stream and can be allowed to settle and be separated in a separate settling reactor. When, for example, the excess quantity of $CO_2$ is small and thus the circulating flow is slowed down, agglomeration of the lignin particles already occurs in the circulation reactor and larger quantities or, in particular, larger lignin particles, precipitate out. Because of the low circulation rate in the circulation reactor, shear forces in the downwardly directed stream in the outer of the concentrically arranged reactor zones are extremely small, so that the lignin agglomerates which are formed are also not destroyed again, constituting a further advantage over the process protocol in accordance with the prior art because with a process protocol of that type, a maturation step for the lignin particles which are formed, which until now has always been necessary, can be dispensed with. For the sake of completeness, it should be noted that not only carbon dioxide, or its concentration, has a substantial influence on lignin precipitation, but also this precipitation is temperature-dependent. Thus, at higher temperatures, a lignin is obtained which is easy to filter, and at lower temperatures, a product which is difficult to filter is obtained.

Because in a further embodiment of the invention, dilute $CO_2$ is introduced into the circulation reactor in order to reduce the pH, in particular offgas from $CO_2$-producing units such as a lime kiln, for example, on the one hand it is possible for offgas present in the unit to be recycled usefully and on the other hand, adding dilute $CO_2$ means that the absorption rate in the alkaline process stream falls, whereupon a more precise precipitation of the desired lignin quality can be obtained. Furthermore, the use of offgas originating from the unit leads to a reduced or smaller carbon footprint of the unit, which is not only advantageous for environmental reasons, but also can significantly reduce the process and production costs for lignin. It hardly needs to be mentioned that the $CO_2$ contained in the offgas from the circulation reactor can be recycled, for example back to the lime kiln.

The expression "dilute $CO_2$", in particular offgas from units producing $CO_2$" as used in the context of the present invention should be understood to mean that further components which are usually present in offgas, such as $SO_2$, CO, NOx, $O_2$ and $N_2$ are not specifically mentioned, but can be incorporated into the process without prior purification of the offgas and do not compromise the continuous process protocol as well as the targeted result.

In accordance with a further embodiment of the invention, the process is carried out at a temperature between 30° C. and 80° C., in particular between 65° C. and 75° C. Because the temperatures are selected so as to be between 30° C. and 80° C., preferably between 65° C. and 75° C., mild process conditions are selected, which ensures that, because large agglomerates or flakes are formed, the lignin which is formed can readily be removed from the reactor. In particular, when the preferred temperature is selected so as to be in the range of not more than 75° C., lignin can precipitate below its glass transition temperature, and at the same time the formation of a further, third phase, which would occur if the lignin were to precipitate out above the glass transition temperature, can be avoided. Preferably, then, the process is carried out with temperature control or under continuous temperature monitoring, in order to optimize the quality of the precipitated lignin. In this regard, temperature control is particularly required because the temperatures of the offgases which are introduced are usually significantly above the desired maximum temperature of 80° C. In this regard, temperature control may be carried out with any known devices such as heat exchangers, temperature-controlled reaction vessels, chillers or the like.

When, as in a further embodiment of the invention, the process is carried out in a manner such that a quality of lignin to be precipitated is adjusted by adjusting a pH with $CO_2$ as the only acidifying agent to values between 13 and 8, preferably between 11 and 9, this means that the quality of the lignin precipitated from the alkaline process stream can be influenced. As is known in the art, the molar mass of lignin as well as the functional groups present in the lignin varies as a function of the pH. Thus, at relatively high pHs, a lignin with a large molar mass is formed, whereas as the pH falls, the molar falls further and further. As a function of the quantity of $CO_2$ as the acidifying agent in the alkaline process stream, rather, the pH of the process stream can be specifically adjusted and thus the desired quality of the lignin can also be adjusted. Thus, when using greatly diluted $CO_2$, a lignin with a high molar mass can be precipitated, whereas when large quantities of $CO_2$ are passed through, the molar mass of lignin is substantially reduced. In addition to the variation in the molar mass, as mentioned, the functional groups present on the lignin also vary, whereupon with a process protocol of this type, a genuinely tailored lignin can be precipitated from the alkaline process stream, in particular from the thickened black liquor. Furthermore, as emerges clearly from the foregoing, fractional precipitation of lignin may be carried out in one and the same circulation reactor and thus, in particular when only small quantities of a lignin with a particular quality are required, this quality may be obtained by adjusting the pH with the aid of the quantity of $CO_2$ fed through the alkaline process stream.

In this context, it should be noted that the reactor may be managed or controlled not only with the aid of the quantity of $CO_2$ which is passed through, but also with the quantity of mother liquor which is introduced, i.e. the thickened black liquor which is added.

In particular, when different lignin fractions are to be precipitated from the alkaline process stream, in a further embodiment of the invention, the process is carried out in a manner such that a plurality of circulation reactors are arranged in succession in a cascade, wherein the process stream which is drawn off from the base of the circulation reactor which is arranged respectively upstream and which has an at least partially reduced lignin content, in particular the thickened black liquor, is passed to the respectively immediately downstream circulation reactor and wherein a fall in pH is maintained in the successive circulation reactors of the cascade from upstream to downstream. With an arrangement or process protocol of this type, fractionated lignin precipitation is possible by a stepwise reduction of the pH from the upstream circulation reactors to the respectively immediately downstream circulation reactor. In this manner, in a continuous process protocol for the reactor, different lignin qualities can be obtained from the alkaline process stream.

By carrying out the process stepwise in this manner, in a further embodiment of the invention, the fall in the value of the pH is adjusted by the $CO_2$ concentration in the $CO_2$-containing gas, wherein the lowest $CO_2$ concentration is supplied to the circulation reactor which is the furthest upstream. The adjustment of the $CO_2$ concentration in the $CO_2$-containing gas in this regard can either be carried out such that offgas from wood pulp production, for example, is supplied to each of the circulation reactors in the cascade, with care being taken that the $CO_2$ concentration increases successively, or a mixture of offgas and fresh gas is supplied, whereupon an even more precise adjustment of the $CO_2$ concentration and thus a more tailored precipitation of the respectively desired lignin quality can be obtained.

In order to obtain a particularly complete separation of the precipitated lignin and in particular to prevent precipitated lignin from circulating as far as possible, in accordance with a further embodiment of the invention, the process is carried out in a manner such that settling of precipitated lignin is carried out in a separate, in particular conically-shaped settling tank. The settled lignin can be withdrawn from this settling tank, in particular from the base of the tank, and recycled, either after purification, or directly.

DESCRIPTION OF THE DRAWING

The invention will now be described in more detail with the aid of an exemplary embodiment, the process protocol of which is shown by the schematic of the device required for carrying out the process, as shown in FIG. 1.

FIG. 1 shows a schematic of a continuous circulation reactor with an attached settling tank which can be used for precipitating lignin from an alkaline process stream.

DETAILED DESCRIPTION OF THE INVENTION

Black liquor from evaporation is supplied to the base region 2 of a circulation reactor 1 via the line 3. The thickened black liquor which is supplied to the circulation reactor 1 via 3 has a dry matter content of approximately 20% to 40% by weight here and originates from cellulose production. In order to be able to manage or control the inflow of the thickened black liquor, a control or regulating valve 4 is also provided in the feed line 3. The temperature of the thickened black liquor which is supplied to the base region 2 of the circulation reactor 1 is between 55° C. and 80° C. here and is temperature-controlled prior to supplying it. Normally, the thickened black liquor is introduced into the reactor at the temperature at which it leaves the evaporator. For the conversion with carbon dioxide, in particular the precipitation of lignin with the aid of $CO_2$, it should be noted here that the higher the temperature of the thickened black liquor, and thus the temperature of the process being carried out in the circulation reactor 1, the faster the $CO_2$ will be absorbed by the thickened black liquor.

$CO_2$ is also supplied to the base region 2 of the circulation reactor 1 via the line 5. In this regard, then, the line 5 discharges into the interior of the reactor 1 in a manner such that it essentially discharges at the bottom end of an inner tubular reactor zone 6. In this manner, i.e. with the line 5 for introducing $CO_2$ discharging at the bottom region of the inner tubular reactor zone 6 of the circulation reactor 1, this ensures that $CO_2$ is essentially introduced into this region only, for example by means of a sieve bottom, a frit or a regulating valve, and by means of the $CO_2$ which is introduced, on the one hand the conversion of thickened black liquor with $CO_2$ is begun, and on the other hand the circulatory movement in the circulation reactor 1 is begun. This occurs because the $CO_2$ rises in the interior of the tubular reactor zone 6 and entrains black liquor with it as it rises, and subsequently, after the upper end 7 of the inner tubular reactor zone 6 is reached, flows over this upper end 7 into the outer annular region 8 of the circulation reactor 1 and thus starts the circulation of material. Because the process, i.e. the conversion of an alkaline process stream or of thickened black liquor, is carried out with $CO_2$ under normal pressure, the extent of the conversion or the rate of acidification of the thickened black liquor with $CO_2$ is dependent on the one hand on the temperature of the thickened black liquor which is introduced and of the gas which is introduced, and on the other hand on the dwell time of $CO_2$ in the interior of the circulation reactor 1, in particular in the interior of the inner tubular reactor zone 6.

When the circulation reactor 1 is operated under normal pressure, the height or length of the inner tubular reactor zone 6 is directly proportional to the dwell time of $CO_2$ inside this zone, and thus of the period which is available for $CO_2$ to convert the thickened black liquor. The longer this conversion period is, the lower will be the pH of the thickened black liquor and this management or control of the pH further means that the quality of the precipitated lignin can be influenced. When the inner tubular reactor zone 6 is selected to be sufficiently high or long, a maximum absorption of $CO_2$ inside this reactor zone 6 may take place, so that offgas which exits the upper end 7 of the inner reactor zone 6 contains substantially no more $CO_2$. Because the height of the inner tubular reactor zone 6 is used as a management or control element, it is consequently important to know the height of the volume of liquid inside the circulation reactor 1, because the height of the liquid volume in the reactor, i.e. how much liquid will be introduced before the reaction is started, or the ratio with respect to the outflow rate of the introduced thickened black liquor, will manage or control the process protocol and in particular will manage the levels in the reactor. As shown as an optional element in FIG. 1, the levels may be managed here by measuring the level of liquid 10 in the interior of the circulation reactor 1 by means of a level managing or control sensor 9, such that when the level of liquid 10 has reached a predetermined maximum value, the supply valve 4 for supplying more fresh thickened black liquor is closed and the excess level of thickened black liquor is recycled via the bypass line 11 into the supply line 3 for thickened black liquor. With this level management or control device, the level in the interior of the circulation reactor 1 is always kept constant and thus a specific, permanently consistent conversion of the introduced thickened black liquor by $CO_2$ is obtained, and thus a consistent product quality is obtained for the precipitated lignin.

Precipitated lignin together with thickened black liquor with a reduced lignin content are drawn from the base of the circulation reactor 1 via the line 12 and in the schematic 1 of FIG. 1 are transferred into a settling tank 13 in which lignin is allowed to sediment out. The sedimented lignin is withdrawn from the settling tank at 15 and the supernatant liquid will, for example, be supplied to further treatment via line 14. The lignin-rich sludge which is withdrawn from the settling tank 13 via line 15 will undergo further purification and the lignin will be supplied to an end use. Instead of the process protocol shown in FIG. 1, it is clearly possible to design the reactor of the circulation reactor 1 with a conical base, for example, to allow lignin to settle out there, in order to draw off the residual thickened black liquor with a reduced lignin content in the upper region of the reactor, approximately at the height at which the black liquor is introduced, to supply it to a further circulation reactor and to carry out the process as a cascade, wherein by means of stronger and stronger acidification of the thickened black liquor, other qualities of lignin can be precipitated each time.

Finally, in order to be able to manage or control the quality of the precipitated lignin even more precisely, the process may be carried out in the circulation reactor 1 by monitoring the pH. To this end, in the outer reactor zone 8, a continuous measurement of the pH is carried out at 16 and when the measurement of the pH shows that the pH is too low for the desired lignin quality to be precipitated, a valve 17 provided in the discharge line 12 is opened in order to withdraw as much as possible of the product stream as quickly as possible. At the same time, for example, the supply of $CO_2$ could be stopped. If, on the other hand, the pH in the interior of the reactor 1 after the $CO_2$ has reached the top of the inner tubular reactor zone 6 is still too high to obtain the desired lignin quality, the valve 17 in the discharge line 12 can be adjusted in a manner such that a further discharge of black liquor with a reduced lignin content originating from the circulation reactor 1 is prevented and the circulation is continued by blowing in $CO_2$ until the desired pH is obtained. It hardly needs to be mentioned that in this case, the valve 4 in the supply line for thickened black liquor must be closed, because otherwise, a surplus quantity of thickened black liquor would be present in the interior of the circulation reactor 1.

When the process in accordance with the invention is carried out in a cascade of circulation reactors 1, then the pH in the individual circulation reactors 1 can be specifically adjusted by the process protocol described above, and thus a specific lignin quality can be precipitated in each individual circulation reactor 1. As is known in the art, lignin with a high molar mass is precipitated at relatively high pHs, whereas lignin with a low molar mass is precipitated at lower pHs.

In summary, it therefore appears that with the process protocol in accordance with the invention, it is firstly possible to manage or control the $CO_2$ absorption by means of the height of the inner tubular reactor zone 6, secondly to manage or control the rate of $CO_2$ absorption with the aid of the temperature which prevails inside the circulation reactor 1, wherein at temperatures of more than 80° C., the glass transition temperature of lignin has already been exceeded and the quality of the product will deteriorate. Preferably, then, the precipitation is carried out at temperatures between 65° C. and 75° C. Thirdly, it is possible to manage or control the process by controlling a level, fourthly it is possible to manage or control the process by managing or controlling a pH, and fifthly, it is possible to configure the process as a cascade of a plurality of circulation reactors 1, whereupon a fractionated precipitation of lignin from the alkaline process stream, in particular thickened black liquor, can be obtained; this lignin can then be supplied for very specific uses. As an example, after precipitating it, the lignin may be oxidized, whereupon water-insoluble or concentrated water-insoluble lignin can be obtained. In the same manner, the process may be carried out using an ion exchanger, so that the lignin can be recycled to the lime kiln as fuel in known manner.

The invention claimed is:

1. A process for isolating lignin from an alkaline process stream of thickened black liquor, comprising introducing the alkaline process stream continuously into a lower region of at least one circulation reactor having an interior with an inner tubular reactor zone and an outer tubular reactor zone in a concentric arrangement so that a liquid level of the alkaline process stream in the interior of the at least one circulation reactor is chosen at a level with an upper end of the inner tubular reactor zone which level is higher than the liquid level of the outer tubular reactor zone and therefore prevents foaming; continuously blowing a $CO_2$-containing gas from the lower region into the inner tubular reactor zone of the at least one circulation reactor, so that the $CO_2$-containing gas is absorbed by the alkaline process stream in the at least one inner circulation reactor zone and offgas is drawn off together with residual amounts of the $CO_2$-containing gas at the top of the at least one circulation reactor; running the process at ambient pressure of 1 atm, and drawing off a thickened black liquor with a reduced lignin content together with precipitated lignin present therein after settling at a base of the at least one circulation reactor.

2. The process as claimed in claim 1, wherein a dwell time for the $CO_2$-containing gas in the circulation reactor is determined by a height of the at least one inner tubular reactor zone.

3. The process as claimed in claim 1, wherein a rate of the $CO_2$-containing gas absorption in the thickened black liquor is managed or controlled by a $CO_2$ concentration in the $CO_2$-containing gas.

4. The process as claimed in claim 1, wherein dilute $CO_2$, in offgas from a lime kiln $CO_2$-producing unit is introduced into the at least one circulation reactor.

5. The process as claimed in claim 1, wherein the process is carried out at a temperature between 30° C. and 80° C.

6. The process as claimed in claim 1, wherein a quality of lignin to be precipitated is managed or controlled by adjusting a pH with $CO_2$ as an acidifying agent to values between 13 and 8.

7. The process as claimed in claim 1, wherein a plurality of circulation reactors are arranged in succession in a cascade, so that the thickened black liquor which is drawn off at the base of the circulation reactor which is arranged respectively upstream and which has an at least partially reduced lignin content is passed to a respectively immediately downstream circulation reactor, and in that a pH drop is maintained in successive circulation reactors of the cascade from upstream to downstream.

8. The process as claimed in claim 7, wherein the fall in value of the pH is adjusted by $CO_2$ concentration in the $CO_2$-containing gas, wherein a lowest $CO_2$ concentration is supplied to the circulation reactor which is furthest upstream.

9. The process as claimed in claim 1, wherein a settling of precipitated lignin is carried out in a separate conically-shaped settling tank.

* * * * *